United States Patent [19]
Koch

[11] Patent Number: 5,715,731
[45] Date of Patent: Feb. 10, 1998

[54] BALANCING DEVICE FOR A ROTATING BODY

[75] Inventor: Michael Koch, Osterrode, Germany

[73] Assignee: Heraeus Instruments GmbH, Hanau, Germany

[21] Appl. No.: 613,160

[22] Filed: Mar. 8, 1996

[30] Foreign Application Priority Data

Mar. 14, 1995 [DE] Germany ............ 195 08 792.5

[51] Int. Cl.[6] .................................................. F16F 15/22
[52] U.S. Cl. ........................ 74/573 F; 74/572; 74/573 R
[58] Field of Search ................ 74/572–574; 192/70.12, 192/70.14

[56] References Cited

U.S. PATENT DOCUMENTS

| | | |
|---|---|---|
| 2,915,901 | 12/1959 | Phelps et al. |
| 3,812,724 | 5/1974 | Curtz et al. |
| 3,951,044 | 4/1976 | Eickmann. |
| 3,967,416 | 7/1976 | Birkenstock et al. ............. 74/573 F |
| 4,905,419 | 3/1990 | Makarov et al. ............. 74/573 F |
| 4,905,807 | 3/1990 | Rohs et al. ............. 74/573 F X |
| 4,913,267 | 4/1990 | Camplebll et al. ............. 192/70.12 |
| 4,919,547 | 4/1990 | Schwartzman. |
| 4,928,548 | 5/1990 | Lualy ............. 74/573 F |
| 5,490,436 | 2/1996 | Coyne et al. ............. 74/572 |

FOREIGN PATENT DOCUMENTS

| | | |
|---|---|---|
| 23 57 629 | 5/1975 | Germany. |
| 141557 | 5/1980 | Germany ............. 74/573 F |
| 29 34 161 | 3/1981 | Germany. |
| 3102726 | 8/1982 | Germany ............. 74/573 F |
| 36 06 618 A1 | 9/1987 | Germany. |
| 3739065 | 5/1989 | Germany ............. 74/573 F |
| 58-037355 | 3/1983 | Japan. |
| 1536228 | 1/1990 | U.S.S.R. ............. 74/573 F |
| 1426506 | 3/1976 | United Kingdom. |

*Primary Examiner*—Vinh T. Luong
*Attorney, Agent, or Firm*—Workman, Nydegger & Seeley

[57] ABSTRACT

In order to achieve a mechanically simple, reliable, and independent balancing device for compensation of an unbalance in a rotating body without the need for a supply of a fluid from outside the rotor nor an adjustment of nozzles to insert the fluid, the balancing device features a feed device with a fluid-containing cavity arranged stationary in or on the body of rotation, which has outlet openings emerging into the balancing chambers, which are to be closed and opened by a movable closing body depending upon the occurrence of an unbalance. Specifically, on or in the body of rotation reside at least three balancing chambers uniformly distributed in the peripheral direction, each of which is connected by an inlet opening to a feed device for a fluid with a specific gravity that is greater than that of air, and with a regulator for regulated feeding of fluid from the feed device into the balancing chambers.

17 Claims, 4 Drawing Sheets

BALANCING DEVICE FOR A ROTATING BODY

BACKGROUND OF THE INVENTION

1. The Field of the Invention

The present invention concerns a balancing device that independently compensates for unbalance in a rotor which can rotate about an axis of rotation, on which or in which at least three balancing chambers are uniformly arranged in the peripheral direction, each of them being connected via an inlet opening to a feed device for a fluid with a specific gravity greater than that of air, and with a regulator for regulated feeding of fluid from the feed device to the balancing chambers.

2. Related Applications

A claim for priority of German Patent No. 195 08 792.5, filed Mar. 14, 1995, incorporated herein by reference, is made for this application.

3 The Relevant Technology

In machines with rotating parts, such as centrifuges, washing machines, or grinding disks, unbalance may occur on the drive shaft or rotor. If the unbalance exceeds a tolerable degree, the accompanying large centrifugal forces may result in destruction of the device and endanger the personnel. For safety reasons, it is therefore necessary to promptly recognize unbalance and eliminate it if possible.

A generic balancing device for automatic compensation of an unbalance in the rotor of a grinding disk is disclosed in German Patent Application DE-A 1 23 57 629. In this device, the rotor is provided on its outer periphery with a ring-shaped container, which is divided into several balancing chambers, separate from each other and uniformly distributed about the periphery. The balancing chambers are provided with outwardly open slots, which describe a partial circle about the axis of rotation and which have different radii in relation to the axis of rotation. Each of the slots is matched up with a stationary nozzle arranged outside the rotor, by which a fluid can be injected directly into the chambers. The supply of fluid is regulated in a distributor assembly, which is outfitted with a number of governable valves corresponding to the number of balancing chambers, by which fluid is supplied to the individual nozzles in dependence on the unbalance occurring. For the regulation in the known device it is necessary to determine the phase of the unbalance or at least its magnitude and to actuate the fluid valves in dependence on the measured quantity. The nozzles must be exactly adjusted to the slots of the balancing chambers. It is to be noted that rotating parts, namely, the rotor, are moved along stationary parts, namely, the nozzles. Therefore, the adjustment is very complicated and the balancing device is prone to malfunction.

SUMMARY AND OBJECTS OF THE INVENTION

An object of the present invention is to provide a mechanically simple, reliable, and independent balancing device for machines that have rotating parts.

It is further an object of the present invention to provide a balancing device for compensation of an unbalance in a rotating body without the need for a supply of a fluid from outside the rotor nor an adjustment of nozzles to insert the fluid.

To achieve the foregoing objects, and in accordance with the invention as embodied and broadly described herein, the present invention is directed to balancing devices comprising a rotor having at least three balancing chambers uniformly arranged in the peripheral direction; an inlet opening connecting the balancing chambers to a feed device; a fluid with a specific gravity greater than air; a regulator for regulated feeding of fluid from the feed device to the balancing chambers.

The feed device has a fluid-containing cavity, arranged stationary in or on the body of rotation, which has outlet openings emerging into the balancing chambers, which are to be closed and opened by a moveable closing body in dependence on unbalance occurring. The movement of the dosing body is in response to the centrifugal force created by an unbalance in the rotating body. Due to the movement in the direction of the unbalance, the closing body opens an outlet opening on the side opposite the unbalance and closes an outlet opening on the side of the cavity facing the unbalance. In this case, it is necessary that the specific gravity of the closing body be larger than that of the fluid.

The fluid in the present invention is provided in a cavity that is arranged stationary in a body of rotation. In turn, neither a supply of fluid from outside the rotor nor an adjustment of nozzles to insert the fluid is necessary in the present invention.

These and other objects and features of the present invention will become more fully apparent from the following description and appended claims, or may be learned by the practice of the invention as set forth hereinafter.

BRIEF DESCRIPTIONS OF THE DRAWINGS

Examples of embodiments of the invention are presented in the drawings and shall be explained in more detail below. The drawings show, schematically:

DETAILED DESCRIPTION OF THE PREFERRED EMBODIMENTS

Figure 1:
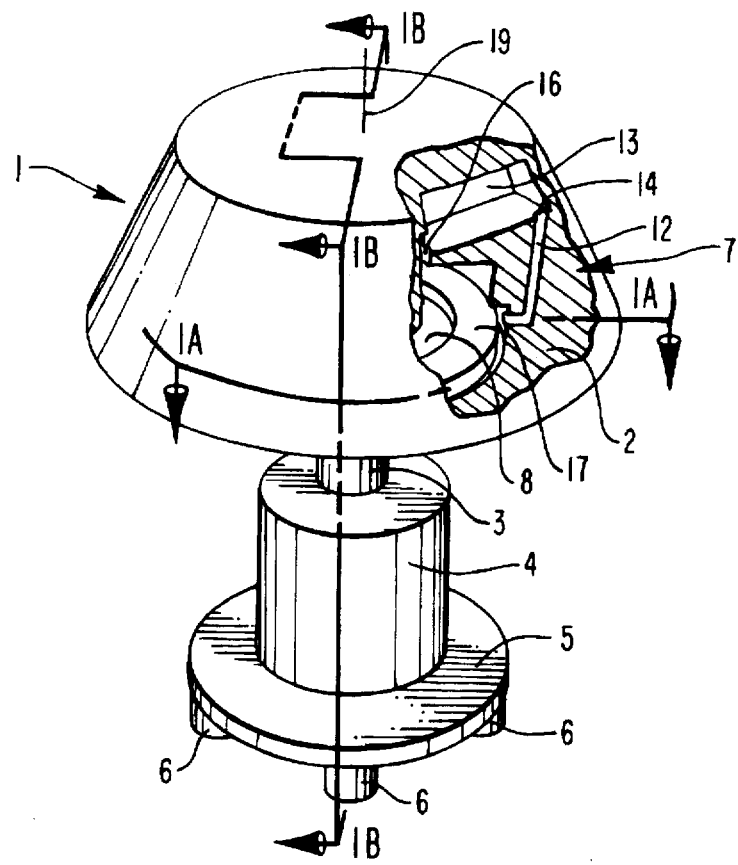
FIG. 1 illustrates a perspective view of a preferred embodiment of the present invention having a cutaway portion.

As mentioned above, the present invention is directed to balancing devices comprising a rotor having at least three balancing chambers uniformly arranged in the peripheral direction; an inlet opening connecting the balancing chambers to a feed device; a fluid with a specific gravity greater than air; a regulator for regulated feeding of fluid from the feed device to the balancing chambers.

The feed device has a fluid-containing cavity, arranged stationary in or on the body of rotation, which has cavity outlet openings emerging into the balancing chambers, which are to be closed and opened by a moveable closing body in dependence on unbalance occurring. The fluid in the invented device is provided in a cavity that is arranged stationary in or on the body of rotation. Thus, a supply of a fluid from outside the rotor and an adjustment of nozzles to insert the fluid is not necessary in the invented device.

The fluid is generally a liquid such as an oil or a cooling fluid. Since it does not need to be supplied from the outside, its flow velocity can also be relatively low; therefore, the fluid can also be a viscous mass, such as a gel or a freely-divided loose powder. In order to avoid unbalance, it is necessary that the fluid be uniformly distributed in the cavity and that the cavity be configured such that it creates no unbalance during the rotation.

The fluid can move from the cavity to the balancing chambers either directly or via a line connecting the cavity and the corresponding balancing chamber. In order for the fluid to contribute to compensating an unbalance, it is necessary that the regulator adjust the supply of fluid to the balancing chambers so that the fluid flows primarily into a balancing chamber roughly opposite the unbalance.

The opening and closing of the cavity outlet openings is accomplished by a movable closing body. Regulation of the movement of the closing body can be based on the centrifugal force additionally created by the unbalance. In this case, it is necessary that the specific gravity of the closing body be larger than that of the fluid. The cavity outlet openings are uniformly distributed over the external dimensions of the cavity. A balancing chamber can be matched up with each cavity outlet opening.

The cavity is configured having a rotational symmetry in relation to the axis of rotation. For example, the cavity can be a ring-shaped space formed inside the rotor, lying about the axis of rotation.

A device in which the closing body is arranged inside the cavity has proven to work especially well. A configuration of the device in which the closing body can move perpendicular to the axis of rotation is especially suitable. When an unbalance occurs, the additional centrifugal force created by this acts hi the direction of this unbalance; thus, in the normal case, it acts roughly perpendicular to the axis of rotation. Thus, the outlet openings of the cavity can be easily closed or opened by means of a closing body which can move in this direction. A closing body of ring shape has proven to work especially well. Such a closing body can be a metal ring or metal disk. In event of an unbalance, an additional centrifugal force acts on the metal ring, for example, pressing it in the direction of the unbalance. This initially intensifies the unbalance of the device. It is therefore important that the possibility of movement or the closing body in the direction of the unbalance be as small as possible, so that the unbalance is only slightly intensified. It is advantageous that the possibility of radial movement lie in the range between 0.1 mm and 3 mm. Due to the movement in the direction of the unbalance, the closing body opens a cavity outlet opening on the side opposite the unbalance and closes an outlet opening on the side of the cavity facing the unbalance.

A device in which the inlet openings to the balancing chambers are arranged above the cavity as seen in the direction of the axis of rotation and are connected by an ascending line to the cavity outlet openings has proven to be especially advantageous. Thanks to the centrifugal force working during the rotation of the rotor, the fluid is injected into the particular balancing chamber via the ascending line. The balancing chambers can be arranged above the cavity as seen in the direction of the axis of rotation. From here, the fluid can then flow back into the cavity, when necessary.

A device in which the distance of the cavity outlet openings from the axis of rotation is less than the distance of the inlet openings to the balancing chambers from the axis of rotation has proven to be especially advantageous. This configuration of the device ensures that the entire fluid of the cavity can move by the centrifugal force through the outlet openings into the particular balancing chambers.

In a preferred embodiment, the closing body has the shape of a ring that lies within the fluid-containing cavity. The ring-shaped closing body has an inner edge and an outer edge and the diameter at the outer edge is smaller than the internal diameter of an outer wall within the cavity by a gap. In this way, the closing body can move freely inside the cavity back and forth in a perpendicular direction to the axis of rotation. However, the closing body's freedom of movement is limited to the width of the gap defined by the difference between the diameter of the outer edge of the closing body and the slightly larger internal diameter of an outer wall within the cavity. Thus, any unbalance existing is only slightly intensified as the closing body moves in the direction of the unbalance. A disk-shaped closing body has proven to be especially suitable, while the cavity is provided with a circumferential groove on its outer periphery, in which the cavity outlet openings are arranged, and the height of the groove as seen in the direction of the axis of rotation is somewhat larger than the disk thickness of the closing body. The edge of the closing body can protrude into the groove, so that it is guided by the groove.

Furthermore, in a preferred embodiment, the width, i.e., the length of the groove extending away from the axis of rotation, of the circumferential groove is smaller than the width of the gap defined by the difference between the diameter of the outer edge of the closing body and the slightly larger internal diameter of an outer wall within the cavity but is greater than half the gap width. Such a configuration of the device guarantees that the closing body cannot move entirely out of the circumferential groove, either in the state of rest or in the state of rotation without unbalance, or even at maximum deflection when an unbalance exists. Thus, in the preferred embodiment the closing body is constantly guided by the circumferential groove.

A preferable configuration of the device is one in which the closing body is fashioned as a circular ring and is provided with channels on its upper or lower side, which lead from the inside of the inner edge of the circular ring to the outside of the outer edge of the circular ring and the height of the circumferential groove is less than 1 mm greater than the disk thickness of the circular ting. In this configuration, the fluid moves within the cavity from inside of the inner edge of the circular ring to the outside of the outer edge of the circular ring through the channels. The channels, for example, can travel radially on the upper side of the circular ring. The amount of fluid which can leave the cavity per unit of time when an unbalance occurs can be regulated by the width and depth of the channels. To prevent jamming, the circular ring is preferably always guided in the circumferential groove.

In still a further preferred embodiment of the present invention, the balancing chambers have a lowest point as seen in the direction of the axis of rotation, where a fluid return outlet for the fluid is provided, emerging into the cavity. In this configuration, the fluid can flow back into the cavity at the end of the rotation.

Moreover, the relating body is preferably spring-loaded and/or cushioned. As a result, the axis of rotation tends toward the direction of the unbalance, due to the centrifugal force. In event of an unbalance, the axis of rotation is deflected and wanders about the actual axis of rotation on a conical envelope surface. This generates an additional centrifugal force in the direction of the unbalance, which then helps the closing body to move in the direction of the unbalance.

FIG. 1 illustrates a rotating body, such as a centrifuge 1, having a rotor 2, which can rotate via a drive shaft 3 from a motor 4 about the axis of rotation 19. The motor 4 is cushioned on rubber feet 6 across a carrier plate 5. An unbalance compensating device 7 is provided inside the rotor 2. The unbalance compensating device 7 has a cavity 8, preferably ring-shaped, inside the rotor 2, filled with a fluid 9, preferably oil. The cavity 8 is provided with a circumferential groove 10 on its outer lower edge. In the embodiment of the invented device shown in FIG. 1, a total of four outlet openings 11 are provided in the circumferential groove 10, each of which is connected by a channel 12 to one of a total of four balancing chambers 13, uniformly distributed in the circumferential direction of the rotor 2 and inside the rotor 2. Thus, two balancing chambers are visible in the vertical plane taken along the axis of rotation 19 positioned opposite one another on a first horizontal axis perpendicular to the axis of rotation. The two other balancing chambers are located on a second horizontal axis, perpendicular to both the first horizontal axis and the axis of rotation 19 and, thus, are not visible in FIG. 1. For the connection to the cavity 8, each of the balancing chambers 13 has an inlet opening 14, into which one of the channels 12 emerges. The inlet openings 14 to the balancing chambers have a greater distance from the axis of rotation 19 than the cavity outlet openings 11, so that the channel 12 in the indicated embodiment slants outward and upward from the cavity outlet opening 11 to the inlet opening 14 to the balancing chamber. The balancing chambers 13 are each formed with a downward sloping floor 15, which emerges into a fluid return outlet 16 to permit the fluid to flow back into the cavity 8.

Inside the cavity 8 there is a closing body 17, preferably a metal ring. The height of the closing body 17 is somewhat lower than the height of the circumferential groove 10, and the dimrioter of the outer edge of the closing body 17 is smaller than the internal diameter of an outer wall within the cavity at the circumferential groove 10 by a gap. The half-width of the gap is indicated by reference number 18 in FIG. 1. When the rotor is at rest or operating in balance, closing body 17 is positioned as shown with the outer edge (reference numeral 39 in FIGS. 2 and 3) about one half-width office gap from the outer wall (reference numeral 45 in FIGS. 2 and 3) of the circumferential groove 10 all the way around the cavity.

Figure 2:
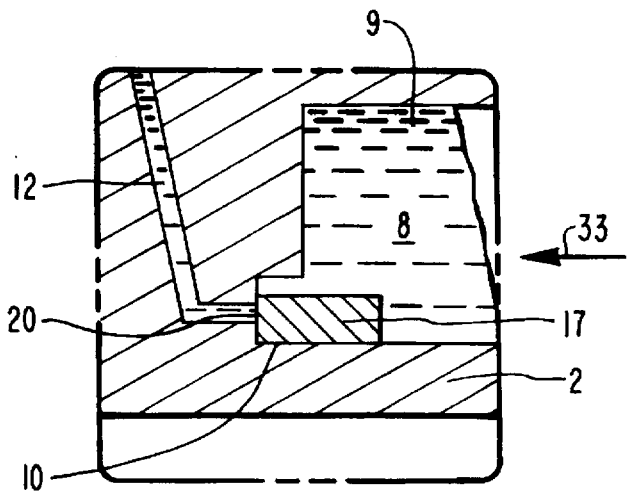
FIG. 2 illustrates an enlarged view of the area marked A in FIG. 6 in event of an unbalance.
Figure 3:
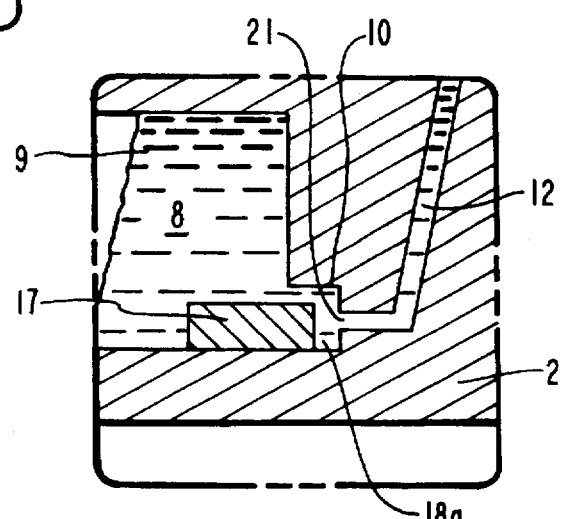
FIG. 3 illustrates an enlarged view of the area marked B in FIG. 1 in event of an unbalance.

The mode of operation of the invented device shall be explained more closely hereafter, using FIG. 1 and the enlarged views of FIGS. 2 and 3 for illustration. When the rotor 2 is motionless, the fluid 9 is located entirely in the cavity 8. If the rotor 2 turns fast enough, the fluid 9 is forced outward by centrifugal force and becomes distributed in the cavity 8 approximately as shown in FIGS. 2 and 3. If no unbalance is present, the centrifugal forces acting on the movable closing body 17 cancel each other out. Thus, the closing body 17 does not move, so that all cavity outlet openings 11 remain open and the fluid 9 is uniformly distributed in the cavity and in the balance chambers 13. If, instead, an unbalance occurs from the outset, the axis of rotation 19 by virtue of the additional centrifugal force created is inclined in the direction 33 of the unbalance and describes a cone about the original axis of rotation 19. Thus, the closing body 17 is now also acted upon by a centrifugal force that presses it in the direction 33 of the unbalance, as shown in FIG. 2. The cavity outlet opening 11 is thereby closed on the side with the unbalance. Because of the closed cavity outlet opening 11, no additional fluid 9 can get into the balancing chambers 13 through channels 12 at the side with the unbalance.

The situation at the side of the axis of rotation 19 opposite the unbalance is shown in FIG. 3. Due to the movement of the closing body 17 in the direction 33 (FIG. 2) of the unbalance, the cavity outlet opening 11 remains open or is opened. Thus, fluid 9 can continue to flow through the channels 12 into those balancing chambers 13 which are opposite the unbalance. Since fluid 9 flows preferably into the balancing chambers 13 opposite the unbalance in this way, the unbalance is gradually compensated. As soon as the unbalance is compensated, the condition represented in FIG. 1 occurs, so that fluid 9 then flows uniformly into the balancing chambers 13 through all channels 12.

After the ccntfifuging is finished, the fluid 9 flows back into the cavity 8 from the balancing chambers 13 through the respective fluid return outlets 16.

In the embodiment of the present invention shown in FIGS. 1–3, the diameter at the outer edge 39 of the closing body 17 and the internal diameter of the outer wall 45 and the width, i.e., the length of the groove extending away from the axis of rotation, of the circumferential groove 10 are coordinated so that the closing body 17 does not move entirely out of the circumferential groove 10 even in event of an unbalance, i.e., when the closing body lies against the outer wall 45 of the circumferential groove 10 at one spot and is correspondingly as far as possible from the outer wall of the circumferential groove at a spot on the opposite side of the axis of rotation. This means that the difference between the diameter at the outer edge of the closing body 17 and the internal diameter of the outer wall of the circumferential groove within the cavity 8 (indicated as the gap with reference number 18a) is less than the width of the circumferential groove 10. Thus, the circumferential groove 10 always acts as a guide for the closing body 17.

As mentioned, it has proven to be especially favorable to make the closing body in the shape of a ring and with an outer edge having a diameter that is smaller than the internal diameter of an outer wall within the cavity by a gap. In this way, the closing body can move freely inside the cavity back and forth in a perpendicular direction to the axis of rotation. However, the closing body's freedom of movement is limited to the width of the gap defined by the difference between the diameter of the outer edge of the closing body and the slightly larger internal diameter of an outer wall within the cavity. Thus, any unbalance existing is only slightly intensified as the closing body moves in the direction of the unbalance. The closing body can be any suitable object that opens or closes the outlet openings in response to the balance or unbalance of the rotating body, including, but not limited to a metal ring and a metal disk.

Figure 4:
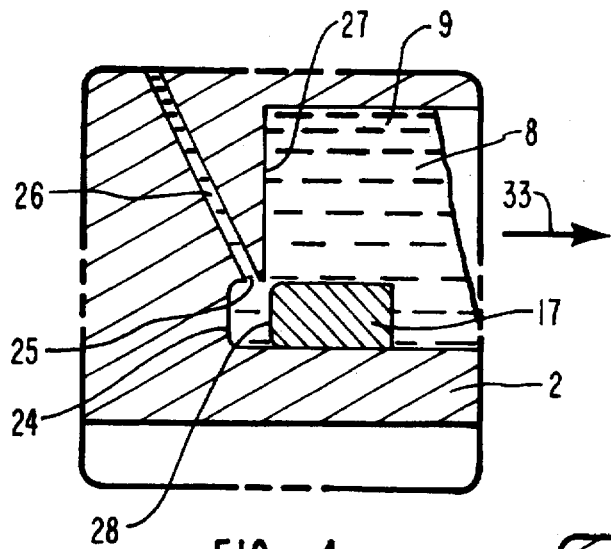
FIG. 4 illustrates an enlarged view of another embodiment of the area marked A in FIG. 1 in event of an unbalance.
Figure 5:
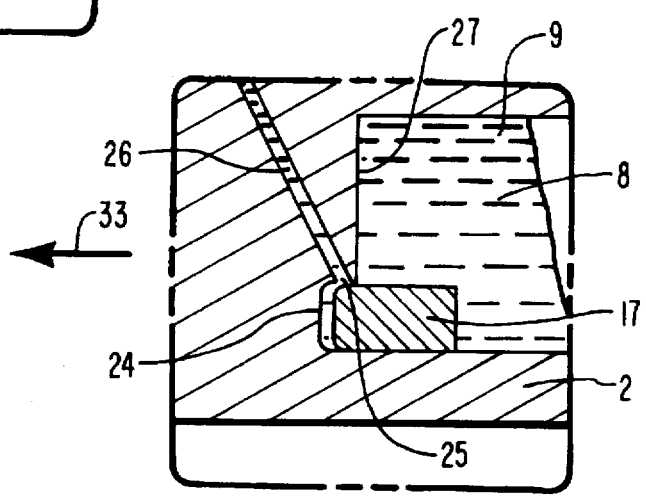
FIG. 5 illustrates the area shown in FIG. 4 in event of an unbalance acting opposite that of FIG. 4.

The configuration of the present invention shown in FIGS. 4 and 5 differs essentially in the type of regulation of the feed of fluid 9 from the cavity 8 into the balancing chambers (not shown here). Again, in this configuration, there is a closing body 17, which can move perpendicular to the axis of rotation 19 within the cavity 8. The thickness of the closing body 17 approximately coincides with the height of the circumferential groove 24. The opening 25 of an ascending line 26 that connects the cavity g to a balancing chamber 13 (shown in FIG. 1) emerges in the upper side of the circumferential groove 24. The diameter of the outer edge 28 of the closing body 17 is less than the internal diameter o f the wall of the circumferential groove 24, but larger than the internal diameter of the wall 27 of the cavity above the circumferential groove 24. In the state of rest, the closing body 17 protrudes into the circumferential groove 24 and seals it off against the rest of the cavity 8. When an unbalance occurs (direction arrow 33), the closing body 17 slips out of the circumferential groove 24 on the side of the cavity 8 opposite the unbalance and thereby releases the opening 25 on that side for the fluid 9. The fluid then flows through the ascending line 26 into a balancing chamber 13 opposite the unbalance and compensates for the unbalance. As soon as the unbalance is compensated, the closing body 17 slides back into its original position by virtue of the centrifugal forces again acting on it uniformly and again closes the opening 25, as shown in FIG. 5. In order to avoid a jamming of the closing body 17 as it slides into the circumferential groove 24, its outer edges 28 are rounded. Thus, this embodiment ensures that fluid 9 only gets into the balancing chambers 13 when an unbalance occurs. It is therefore especially suitable for the situation in which unbalance occurs only during the operation of the rotating body.

Figure 6:
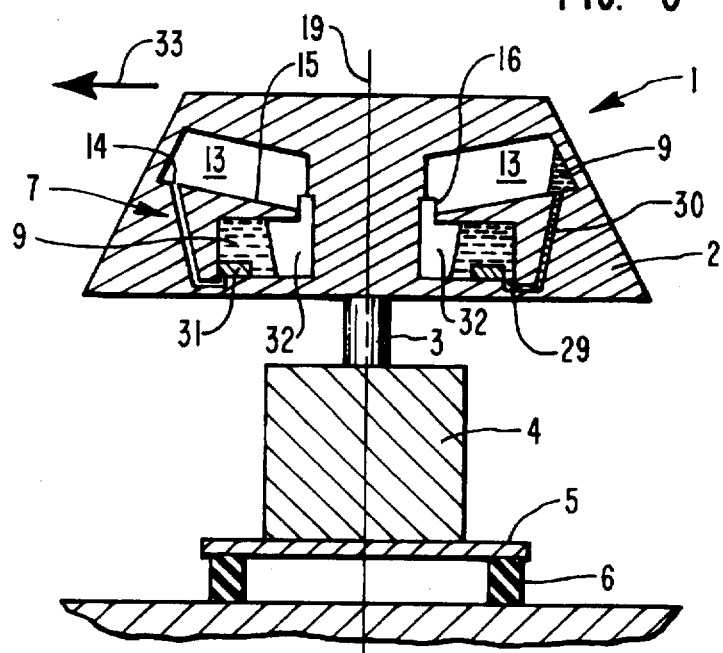
FIG. 6 illustrates a vertical pirate view taken along the line of the axis of rotation 19 of a rotating body with a different embodiment of the invented device for independent compensation of an unbalance.

The embodiment of the present invention illustrated in FIG. 6 is based on a similar regulation of the feed of fluid. Unless otherwise indicated, components show in FIG. 6 are numbered to correspond with FIG. 1. The explanations given for those components with reference to FIG. 1, also apply to the corresponding parts in FIG. 6.

In this embodiment, a number of cavity outlet openings 29 for a fluid 9 corresponding to the number of balancing chambers 13 are provided in the ring shaped cavity 32. The cavity outlet openings 29 are each connected by a line 30 to a balancing chamber 13. These cavity outlet openings 29 are laid on a circular ring about the axis of rotation 19 in the area of the outer wall of the cavity 32. In a state of rest, the cavity outlet openings 29 are covered by the ring shaped metal disk 31, serving as a closing body. For this, the outer diameter of the metal disk 31 is somewhat larger and the inner diameter is somewhat smaller than the diameter of the circular ring at the position of the cavity outlet openings 29. In order to assure room for movement in the direction 33 of the unbalance, however, the outer diameter of the metal disk 31 is smaller than the outer diameter of the ring-shaped cavity 32. It is understood that the ring shaped metal disk closing body used in this embodiment can be any suitable closing body.

In the preferred embodiment of the invention, a disk-shaped closing body has proven to be especially suitable wherein the cavity is provided with a circumferential groove on its outer periphery, in which the cavity outlet openings are arranged, and the height of the groove as seen in the direction of the axis of rotation is somewhat larger than the disk thickness of the closing body. In turn, the edge of the closing body can protrude into the groove, so that it is guided by the groove.

In addition, it has proven to work especially well if the width, i.e., the length of the groove extending away from the axis of rotation, of the circumferential groove is smaller than the gap and greater than half the gap width, the gap being the difference between the diameter of the outer edge of the closing body and the internal diameter of the wall of the circumferential groove. Such an embodiment guarantees that the closing body cannot move entirely out of the groove either in the state of rest or in the state of rotation without unbalance, or even at maximum deflection when an unbalance exists. Thus, it is constantly guided by the groove.

FIG. 6 shows the situation when an unbalance is present. The metal disk 31 moves in the direction 33 of the unbalance inside the cavity 8. In this way, the metal disk 31 continues to covet the cavity outlet openings 29 on the side with the unbalance and at the same time uncovers one or more cavity outlet openings 29 on the opposite side. Thanks to the centrifugal force, fluid 9 then flows through the uncovered cavity outlet opening 29 or outlet openings 29 and through the corresponding connection lines 30 into the balancing chamber 13 or balancing chambers 13 on the side of the rotor 2 opposite the unbalance and thereby compensates for the unbalance.

Figure 7:
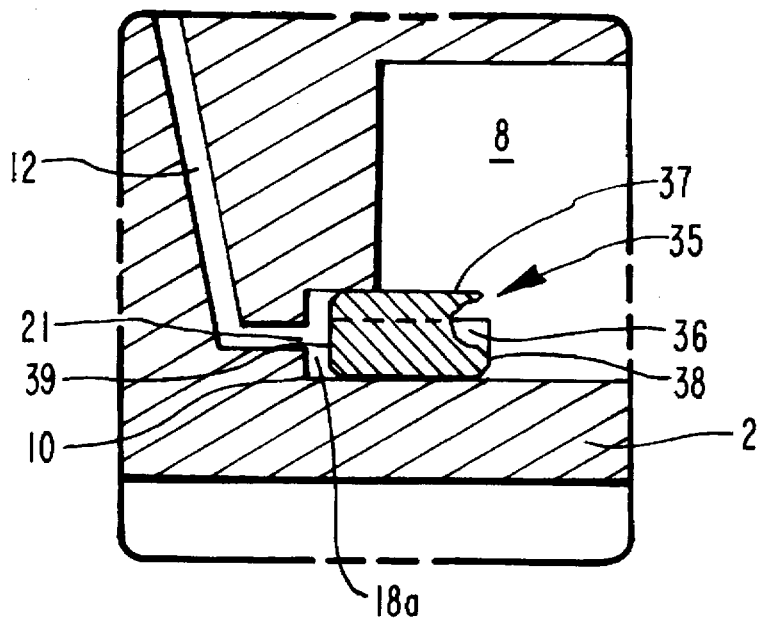
FIG. 7 illustrates a section of another embodiment of the balancing device.
Figure 8:
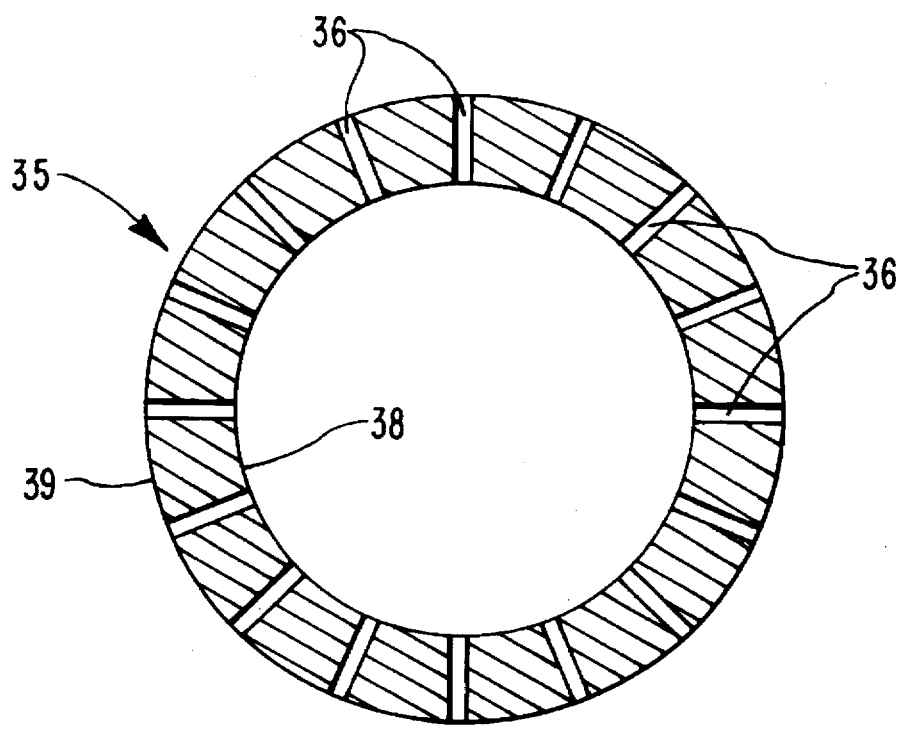
FIG. 8 illustrates a horizontal plane view of a top cross-section of an embodiment of the closing body with radially traveling channels.

Unless otherwise indicated, components shown in FIG. 1 are numbered correspondingly in FIGS. 7 and 8. FIG. 7 shows another embodiment of the invented device in cross section. This embodiment differs from that of FIG. 1 only in the closing body 17.

In the embodiment illustrated in FIG. 7, the closing body is preferably fashioned in the form of a circular ring 35. The height of the circular ring is around 0.1 mm smaller than the height of the circumferential groove 10 located at the outer periphery of the cavity 8. The closing body is provided with channels 36 (shown by cutaway) on its upper side 37, which travel from the inner edge 38 of the circular ring to the diameter of the outer edge 39. The diameter of the outer edge 39 of the circular ring 35 is preferably 0.4 mm smaller than the internal diameter of the wall within the cavity 8 in the area of the circumferential groove 10. This means that the circular ring 35, in event of an unbalance, can shift by a maximum of 0.2 mm from its position in the state of rest in the direction of the unbalance. Furthermore, the width, i.e., the length of the groove extending away from the axis of rotation, of the circumferential groove 10 is such that the circular ring 35 also cannot leave the circumferential groove. 10 anywhere when an unbalance is present; thus, it is always guided in the circumferential groove 10 and therefore cannot become jammed.

In FIG. 8, the closing body 35 is shown in top view. As can be seen, the channels 36 lead radially from the inside 38 to the outside 39. Depth and width of the channels 36 are chosen so that fluid 9 used to balance the weight flows only slowly from the cavity 8 into the balancing chambers 13.

A preferable configuration of the present invention is one in which the closing body is fashioned as a circular ring and is provided with channels on its upper or lower side, which lead from the inside of the circular ring to the outside, and the height of the circumferential groove is less than 1 mm greater than the disk thickness of the circular ring. In this configuration, the fluid moves within the cavity from inside of the inner edge of the closing body to the outside of the outer edge of the closing body through the channels. The channels, for example, can travel radially on the upper side of the circular ring. The amount of fluid which can leave the cavity per unit of time when an unbalance occurs can be regulated by the width and depth of the channels. To prevent jamming, the circular ring is advantageously always guided in the circumferential groove.

It has proven to be especially favorable to have the rotating body either spring-loaded or cushioned, or both. As a result, the axis of rotation tends toward the direction of the unbalance, due to the centrifugal force. In event of an unbalance, the axis of rotation is deflected and wanders about the actual axis of rotation on a conical envelope surface. This generates an additional centrifugal force in the direction of the unbalance, which then helps the closing body to move in the direction of the unbalance.

The present invention may be embodied in other specific forms without departing from its spirit or essential characteristics. The described embodiments are to be considered in all respects only as illustrated and not restrictive. The scope of the invention is, therefore, indicated by the appended, claims rather than by the foregoing description. All changes which come within the meaning and range of equivalency office claims are to be embraced within their scope.

What is claimed and desired to be secured by United States Letters Patent is:

1. A self-balancing rotor that can rotate about an axis of rotation, said rotor comprising:

at least three balancing chambers positioned within said rotor peripheral to said axis of rotation and arranged such that said rotor is balanced with respect to said axis of rotation;

a cavity positioned within said rotor peripheral to said axis of rotation and arranged such that said rotor is balanced with respect to said axis of rotation, said cavity containing a fluid having a specific gravity greater than air and being in communication with said balancing chambers so that said fluid can flow only between said cavity and said balancing chambers, said fluid being completely self-contained within said rotor and said fluid being entirely distributed between said cavity and said balancing chambers;

a regulator for regulating the flow of said fluid from said cavity to each said balancing chamber, said regulator positioned within said cavity and adapted to proportion the flow of said fluid from said cavity among the balancing chambers in response to the balance of centrifugal forces generated during rotation of said rotor.

2. A self-balancing rotor as recited in claim 1, wherein said balancing chambers are uniformly arranged in the peripheral direction from said axis of rotation.

3. A self-balancing rotor as recited in claim 1, wherein said communication between said cavity and said balancing chambers is through a plurality of connecting channels.

4. A self-balancing rotor as recited in claim 3, wherein each of said connecting channels comprises a cavity outlet opening in said cavity and a chamber inlet opening in one of said balancing chambers.

5. A self-balancing rotor as recited in claim 4, wherein said regulator is a movable closing body arranged within said cavity such that movement of said closing body in response to centrifugal forces acting upon said closing body during rotation of said rotor opens and closes said cavity outlet openings.

6. A self-balancing rotor as recited in claim 5, wherein said closing body is adapted to move back and forth in a perpendicular direction to the axis of rotation.

7. A self-balancing rotor as recited in claim 5, wherein said closing body is ring shaped.

8. A self-balancing rotor as recited in claim 5, wherein said cavity is ring-shaped and said closing body is ring shaped having a diameter at an outer edge that is smaller than the internal diameter of an outer wall within said cavity by a gap width.

9. A self-balancing rotor as recited in claim 8, wherein said cavity is ring-shaped and includes a circumferential groove at its outer periphery, wherein said outer edge of said closing body is configured to fit within said circumferential groove.

10. A self-balancing rotor as recited in claim 9, wherein said circumferential groove extends outwardly from the axis of rotation a distance less than the entire gap width but greater than one half of the gap width.

11. A self-balancing rotor as recited in claim 10, wherein said closing body is a ring having an inner edge, an outer edge, an upper surface and a lower surface, wherein said closing body has at least one channel leading from inside of said inner edge to outside of said outer edge on at least one of said upper surface or said lower surface of said closing body.

12. A self-balancing rotor as recited in claim 11, wherein said circumferential groove is configured to be less than 1 mm higher than said outer edge of said closing body.

13. A self-balancing rotor as recited in claim 4, wherein the distance of said cavity outlet openings from said axis of rotation is less than the distance of said chamber inlet openings from said axis of rotation.

14. A self-balancing rotor as recited in claim 1, wherein said cavity is a ring-shaped cavity in rotational symmetry to the axis of rotation.

15. A self-balancing rotor as recited in claim 1, wherein said cavity includes a ring-shaped cavity having a circumferential groove at its outer periphery.

16. A self-balancing rotor as recited in claim 1, wherein said balancing chambers further comprise fluid return outlets in communication with said cavity.

17. A self-balancing rotor as recited in claim 1, wherein said fluid return outlets are located at a lowest point in said balancing chambers.

* * * * *

UNITED STATES PATENT AND TRADEMARK OFFICE
CERTIFICATE OF CORRECTION

PATENT NO. : 5,715,731
DATED : February 10, 1998
INVENTOR(S) : Michael Koch

It is certified that error appears in the above-identified patent and that said Letters Patent is hereby corrected as shown below:

Col. 1, line 35, after "chambers" change "arc" to --are--

Col. 2, line 12, before "body" change "dosing" to --closing--

Col. 2, line 39, after "the" change "life" to --line--

Col. 2, line 50, after "vertical" change "pirate" to --plane--

Figure 1A:
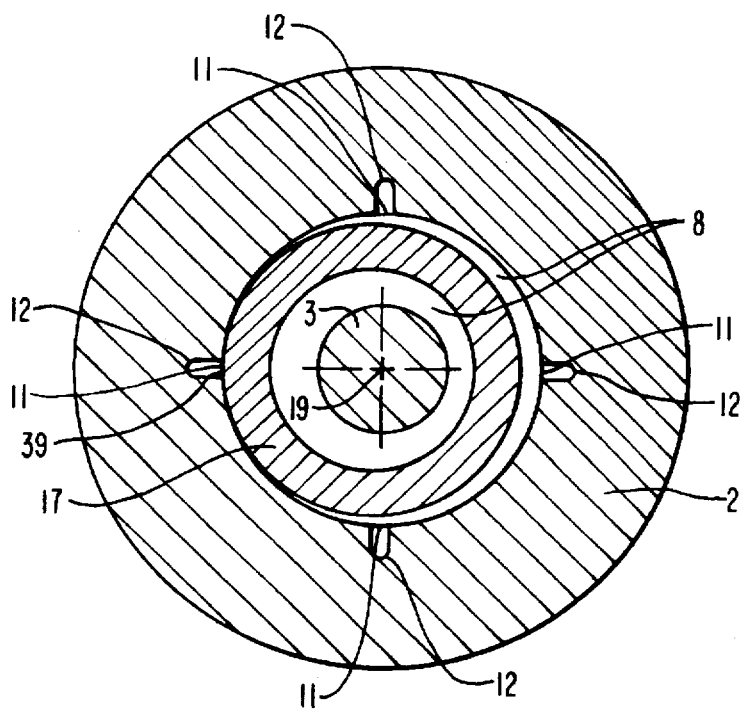
FIG. 1A illustrates a cross-section of the device shown in FIG. 1 taken along the life 1A.
Figure 1B:
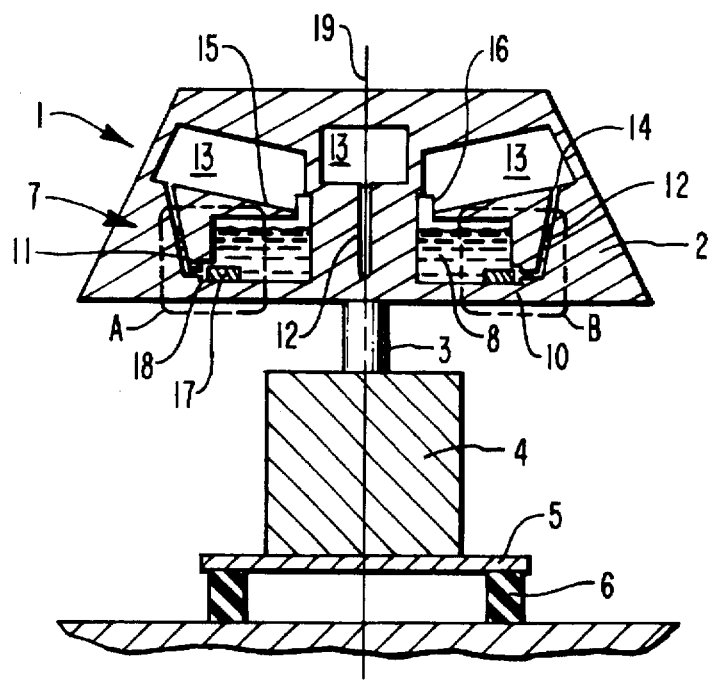
FIG. 1B illustrates a cross-section of the device shown in FIG. 1 taken along the line 1B.

Col. 5, line 14, after "illustrates" insert --a perspective view of a preferred embodiment of the present invention having a cutaway portion. Figures 1A and 1B are cross-section views taken along the lines 1A and 1B, respectively. As seen in these Figures 1, 1A and 1B, the device comprises--

Col. 5, line 20, after "ring-shaped" insert --(best shown in Figure 1A)--

Col. 5, line 34, after "19" insert a period

Col. 5, line 34, after "19" delete "and, thus, are not visible in FIG. 1" and insert --Accordingly, three balancing chambers are visible in the cross-seciton view of Figure 1B--

Col. 5, line 49, after "the" change "dimrioter" to --diameter--

Col. 6, line 27, after "the" change "ccntfifuging" to --centrifuging--

UNITED STATES PATENT AND TRADEMARK OFFICE
CERTIFICATE OF CORRECTION

PATENT NO. : 5,715,731
DATED : February 10, 1998
INVENTOR(S) : Michael Koch

It is certified that error appears in the above-identified patent and that said Letters Patent is hereby corrected as shown below:

Col. 7, line 6, after "cavity" change "g" to --8--

Col. 7, line 10, after "diameter" change "o f" to --of--

Col. 8, line 11, after "to" change "covet" to --cover--

Signed and Sealed this

Thirteenth Day of October 1998

Attest:

BRUCE LEHMAN

Attesting Officer

Commissioner of Patents and Trademarks